US010126808B2

(12) United States Patent
Spiel et al.

(10) Patent No.: US 10,126,808 B2
(45) Date of Patent: Nov. 13, 2018

(54) DYNAMIC POWER MANAGEMENT (71) Applicant: Cisco Technology, Inc., San Jose, CA (US)

(72) Inventors: Seth Brandon Spiel, San Francisco, CA (US); Morgan Davis Teachworth, Campbell, CA (US); Ian Matthew Snyder, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/726,565

(22) Filed: May 31, 2015

(65) Prior Publication Data

US 2016/0349829 A1  Dec. 1, 2016

(51) Int. Cl.
G06F 1/32 (2006.01)

(52) U.S. Cl.
CPC .......... G06F 1/3287 (2013.01); G06F 1/3209 (2013.01); G06F 1/3212 (2013.01); *Y02D 10/171* (2018.01); *Y02D 10/174* (2018.01)

(58) Field of Classification Search
CPC .... G06F 1/3209; G06F 1/3212; G06F 1/3287; Y02D 10/174
See application file for complete search history.

(56) References Cited

U.S. PATENT DOCUMENTS

| | | | | |
|---|---|---|---|---|
| 5,532,935 A * | 7/1996 | Ninomiya | ............. | G06F 1/3203 307/31 |
| 6,532,375 B2 * | 3/2003 | Cathey | ................. | H02J 7/0063 455/343.1 |
| 7,383,451 B2 * | 6/2008 | Matsushima | ......... | G06F 1/3287 713/300 |
| 7,430,675 B2 * | 9/2008 | Lee | ....................... | G06F 1/3203 482/8 |
| 7,598,702 B2 * | 10/2009 | Walrath | .................... | G06F 1/26 320/107 |
| 7,725,094 B2 * | 5/2010 | Chary | .................. | G06F 1/3203 455/343.2 |
| 8,001,400 B2 * | 8/2011 | Fadell | .................... | G06F 1/3203 713/300 |
| 8,160,753 B2 * | 4/2012 | Ferentz | ................... | H04L 12/10 700/295 |
| 8,930,729 B1 * | 1/2015 | Fifield | ....................... | G06F 1/26 713/300 |
| 8,996,891 B2 * | 3/2015 | Tabone | ............ | G06F 17/30097 713/300 |
| 9,280,193 B2 * | 3/2016 | Weilnau, Jr. | .............. | G06F 1/30 |
| 2005/0085277 A1 * | 4/2005 | Chen | ..................... | G06F 1/3215 455/572 |
| 2006/0053324 A1 * | 3/2006 | Giat | ........................ | H04L 12/10 713/300 |
| 2006/0190745 A1 * | 8/2006 | Matsushima | ......... | G06F 1/3287 713/300 |

(Continued)

*Primary Examiner* — Abdelmoniem Elamin (74) *Attorney, Agent, or Firm* — Fernando & Partners, LLP; Ying Li (57) ABSTRACT

In one embodiment, a method includes obtaining a first value indicative of an amount of power available to a device from a power source, obtaining a second value indicative of an amount of power consumed by the device, and selecting, based on the first value and second value, one or more power consuming functions of the device in order to manage power consumption of the device.

19 Claims, 7 Drawing Sheets

(56) References Cited

U.S. PATENT DOCUMENTS

| | | | |
|---|---|---|---|
| 2008/0133956 A1* | 6/2008 | Fadell | G06F 1/3203 |
| | | | 713/340 |
| 2010/0030392 A1* | 2/2010 | Ferentz | H04L 12/10 |
| | | | 700/295 |
| 2012/0295574 A1* | 11/2012 | Chen | H02J 1/14 |
| | | | 455/404.1 |
| 2014/0082383 A1* | 3/2014 | De Cesare | G06F 1/3206 |
| | | | 713/320 |
| 2014/0100838 A1* | 4/2014 | Stelmakh | G06F 1/3275 |
| | | | 703/21 |
| 2014/0208140 A1* | 7/2014 | Brooks | G06F 1/28 |
| | | | 713/320 |

* cited by examiner

DYNAMIC POWER MANAGEMENT

TECHNICAL FIELD

The present disclosure relates generally to power management, and in particular, to systems, methods and apparatuses enabling dynamic power management of an operating device.

BACKGROUND

The ongoing development, maintenance and expansion of data networks often involves incorporating additional functionality into and enabling greater connectivity with previously deployed equipment, in addition to deploying new networking equipment. The transmission media by which devices are connected may allow for the communication of data between devices and, in some instances, also allow for the transmission of power between devices. The simplification of using the same cable (and input/output ports) for transmission of both data and power between devices may enhance the user experience.

Powering devices via a transmission media rather than an independent power source presents a number of challenges. For example, the amount of power received via a transmission media which also carries data may be significantly less than the amount of power that may be drawn from a dedicated power source, such as a battery or via a wall outlet. Thus, a device that draws power via such a transmission medium may have a reduced power budget and may not be able to perform the same number of functions as an independently powered device within that power budget or may not be able to provide the same level of performance of performed functions that an independently powered device may provide.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for dynamically managing power consumed by a device. For example, in some implementations, a method includes obtaining a first value indicative of an amount of power available to a device from a power source, obtaining a second value indicative of an amount of power consumed by the device, and selecting, based on the first value and second value, one or more power consuming functions of the device in order to manage power consumption of the device.

Example Embodiments

When operating a device, numerous factors determine the functions or features that may be enabled before the amount of power that would be consumed by the device is greater than that available, risking failure of the device. For example, workload, manufacturing variation, environmental factors, mounting methods, and usage can affect the power consumed by a device with a particular set of functions enabled. Product developers may design a device with reduced performance and/or functionality to compensate for worst-case scenarios and ensure that there is a large enough safety margin between power available and power consumed to avoid failure of the device.

When power is received via a transmission media which also carries data, the amount of power available to a device may be significantly less than the amount of power that may be drawn from a dedicated power source. For example, a wireless access point deriving power via an Ethernet cable using the IEEE (Institute of Electrical and Electronics Engineers) 802.3af standard may, in order to fit within the power budget, have a significantly reduced feature set as compared to a wireless access point deriving power from another source. Similarly, products with multi-gigabit Ethernet, multiple radios, or second-generation IEEE 802.11 ac radios may have difficulty fitting under the larger power budget of the IEEE 802.3at PoE (Power over Ethernet) standard.

In some implementations, power consumption is monitored (or estimated) and controlled to safely reduce the difference between power available and power consumed by selectively enabling or disabling functions during runtime.

For example, in some implementations, a power control module determines the amount of power available to a device and the amount of power consumed by the device during operation of the device. Based on the difference between these amounts, the power control module may select one or more functions of the device and enable (or disable) the functions.

Determining the amount of power consumed by the device and determining which functions of the device to enable or disable may be based on information from a number of different sources. For example, the power control module may base its determinations on inputs from a memory storing manufacturing or empirical test data, hardware sensors of the device, a module producing predictive information about the computational workload of a user of the device, the Internet, and/or closed databases of network and device statistics such as that of a cloud-based controller. These inputs may be used to intelligently remove the safety margin built into the power and thermal budget of a device, allowing it to reach higher levels of performance than would otherwise be possible. In particular, using information from hardware sensors of the device in parallel with information from a cloud-based controller architecture may make it possible to deliver an enhanced user experience in which data from millions of devices generated in real time is used to make power decisions for the device in the field.

Figure 1:
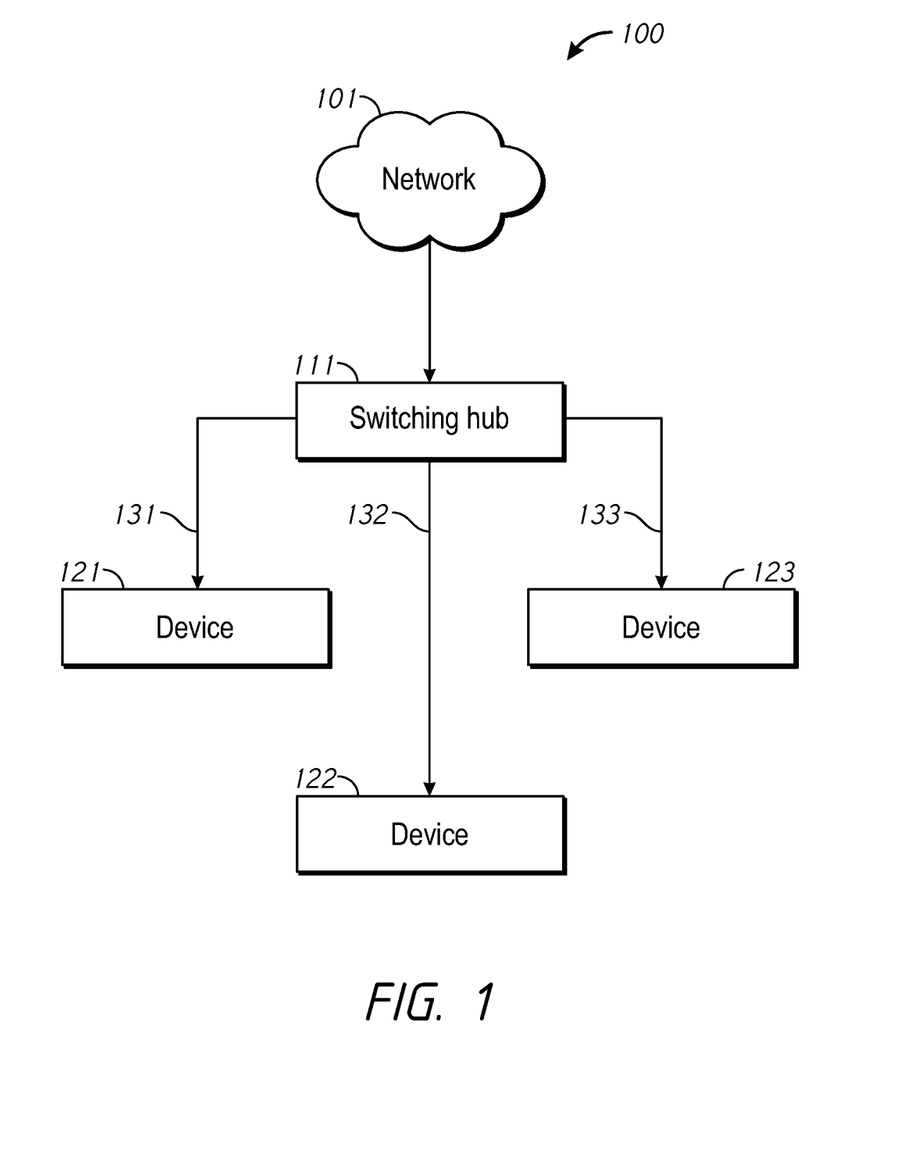
FIG. 1 is a block diagram of a data network in accordance with some implementations.

FIG. 1 is a block diagram of a data network 100 in accordance with some implementations. The data network 100 includes a switching hub 111 that couples a number of devices 121-123 to a network 101. The network 101 may include any public or private LAN (local area network) and/or WAN (wide area network), such as an intranet, an extranet, a virtual private network, and/or portions of the Internet. In some implementations, one or more of the devices 121-123 are physical devices including hardware and software for performing one or more functions. Example physical devices include, without limitation, network routers, wireless access points, IP (internet protocol) cameras, VoIP (voice over IP) phones, intercoms and public address systems, clocks, sensors, access controllers (e.g., keycard readers), lighting controllers, security systems, building management systems, etc. In some implementations, one or more of the devices 121-123 may be virtual devices that consume power through the use of underlying hardware.

The switching hub 111 (which may also be referred to as a network switch, a bridging hub, or a MAC [media access control] bridge) receives and transmits data between the network 101 and the devices 121-123. In some implementations, the switching hub 111 manages the flow of data of the data network 100 by transmitting messages received from the network 101 to the device 121-123 for which the messages are intended. In some implementations, each device 121-123 coupled to the switching hub 111 is identified by a MAC address.

The switching hub 111 is communicatively coupled to each of the devices 121-123 via respective transmission media 131-133, which may be wired or wireless. In some implementations, the switching hub 111, in addition to receiving and transmitting data via the transmission media 131-133, provides power to the devices 121-123 via the transmission media 131-133. For example, in some implementations, the switching hub 111 is coupled to the devices 121-123 via an Ethernet cable. In some implementations, the switching hub 111 provides power to the devices 121-123 on unused conductors of the cable or by applying a common-mode voltage to each pair of conductors of the cable. In some implementations, the switching hub 111 provides power to the devices 121-123 wirelessly in addition to wirelessly receiving and transmitting data. In various implementations, the switching hub 111 provides power to the devices 121-123 wirelessly using near-field techniques (e.g., via one or more inductive charging base stations) or far-field techniques (e.g., via one or more power beaming stations).

In some implementations, the switching hub 111 provides power to the devices 121-123 via the Ethernet cable according to a Power over Ethernet (PoE) standard. In some implementations, the switching hub 111 provides power to the devices 121-123 according to the IEEE 802.3af standard. For example, in some implementations, the switching hub 111 outputs 15.4 W (watts) of power to each device 121-123. Due to power loss caused by resistance of the Ethernet cable, each device 121-123 may receive less than 15.4 W of power. For example, the devices 121-123 may receive as little as 12.95 W of power. In some implementations, the switching hub 111 provides power to the devices 121-123 according to other standards, such as IEEE 802.3af, IEEE 802.3at, or IEEE 802.3bt. In some implementations, the switching hub 111 provides power to the devices 121-123 via other types of transmission media 131-133, such as a USB (Universal Serial Bus) cable, an IEEE 1394 (FireWire) cable, or over-the-air using inductive power.

Figure 2:
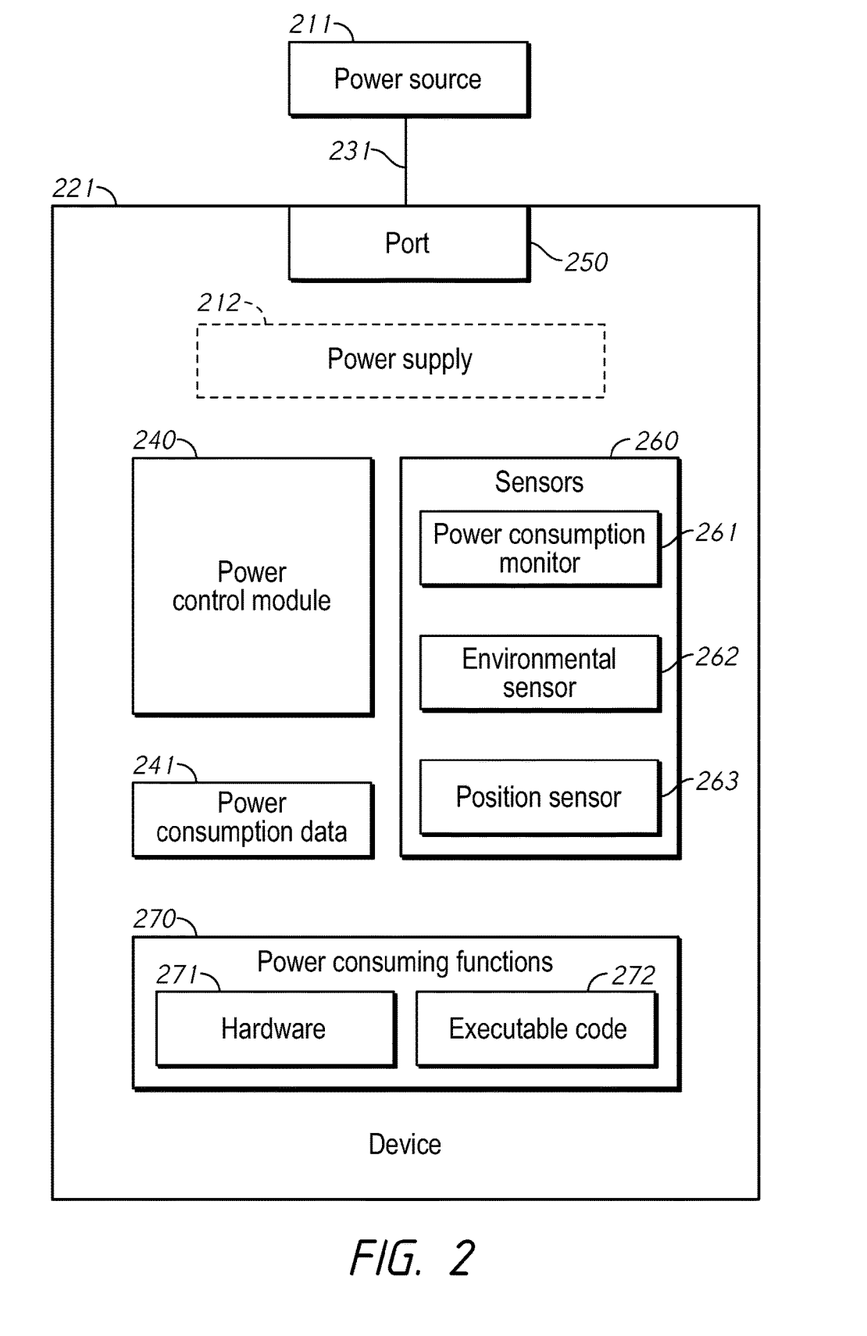
FIG. 2 is a block diagram of a device powered by a power source in accordance with some implementations.

FIG. 2 is a block diagram of a device 221 powered by a power source 211 in accordance with some implementations. The device 221 may correspond to any of the devices 121-123 of FIG. 1 and the power source 211 may correspond to the switching hub 111 of FIG. 1.

The device 221 includes a port 250 for receiving power from the power source 211 via a transmission medium 231. The transmission media 231 may be a wired or wireless transmission medium. In some implementations, the transmission medium 231, in addition to providing power to the device 221, carries data from and to the device 221. Similarly, in some implementations, the port 250, in addition to receiving power from the power source 211, receives and transmits data. Although the power source 211 is shown as external to the device 221 in FIG. 2, it is to be appreciated that aspects of the disclosure may be used in implementations in which the device 221 includes an internal power supply 212, such as one or more batteries. In some implementations, the transmission medium 231 is, for example, an Ethernet cable and the port 250 is an Ethernet port. In some implementations, the port 250 is a USB port or an IEEE 1394 (FireWire) port for receiving a USB cable or IEEE 1394 (FireWire) cable, respectively.

The device 221 includes a power control module 240 that selectively enables and disables power consuming functions 270 of the device. The power consuming functions 270 may include hardware 271 and/or executable code 272. For example, in some implementations, the hardware 271 includes backup 2.4 GHz radios, interference scanning radios or Bluetooth/Bluetooth Low Energy radios or additional data ports (e.g., USB or Ethernet ports). In some implementations, the executable code 272 includes software for performing one or more functions, such as security functionality or spectral analysis.

In some implementations, the power consuming functions 270 includes enhanced versions of other power consuming functions 270, particularly of core power consuming functions 270. For example, in some implementations, the power consuming functions 270 include increased data throughput, RF (radio frequency) transmit/receive chains, modulation/coding schemes, transmit power, high bandwidth Ethernet modes, increased CPU (central processing unit) frequency, increased memory frequency, increased memory refresh rates, an increased number of active memory banks, and/or increased system bus frequencies. Thus, in some implementations, enabling (or disabling) a power consuming function 270 includes increasing or decreasing a hardware or software parameter, such as CPU frequency.

The power control module 240 selectively enables and disables the power consuming functions 270 based on an amount of power received from the power source 211 (or the internal power supply 212) and/or an amount of power consumed by the device 221. For example, according to the IEEE 802.3af standard, the device 221 may expect to receive 12.95 W of power via an Ethernet cable. In reality, the device 211 may be able to draw more power via the cable, particularly if the cable is short or of high quality. For example, the device 211 may be able to draw up to 13.87 W from a Category 5 cable, a 7.1% increase in the amount of power drawn. In response to receiving a signal indicating that the amount of power available is greater than 12.95 W, the power control module 240 may enable additional power consuming functions 270. Similarly, the device 221 may be expected (or designed) to consume 12.5 W of power during operation with a particular set of power consuming functions 270 enabled. In response to determining that the device 221, in operation with the set of power consuming functions 270 enabled, is consuming less than 12.5 W of power, the power control module 240 may enable additional power consuming functions 270.

The power control module 240 may determine the amount of power available to the device 221 from the power source 211 in a number of ways. In some implementations, the power control module 240 determines the amount of power available to the device 221 based on a signal received from the power source 211 via the port 250. In some implementations, the signal encodes a value indicative of an amount of power available to the device (e.g., in watts). In some implementations, the signal encodes a flag indicative of a power standard (e.g., IEEE 802.3af or IEEE 802.3at) employed by the power source 211 in delivering power to the device 221.

In some implementations, the internal power supply 212 includes one or more batteries that provide varying amounts of power depending on temperature, age, size, discharge current, etc. In some implementations, the power control module 240 determines the amount of power available to the device 221 from the internal power supply 212 based on a signal received from such batteries, measuring an amount of power provided by the batteries, or estimating an amount of power based on a measured temperature, recorded age, or other data.

The power control module 240 may also determine the amount of power consumed by the device 221 in a number of ways. In some implementations, the power control module 240 determines the amount of power consumed by the device 221 using data indicative of actual power consumption (by the device 221 or similar devices), rather than the amount of power the device 221 was designed to consume. The device 221 includes a number of sensors 260 which generate data that may be used by the power control module 240 to determine the amount of power consumed by the device 221. In some implementations, the sensors 260 includes a power consumption monitor 261 that generates data, such as a monitored value, indicative of the amount of power consumed by the device 221. In some implementations, the power consumption monitor 261 includes, for example, a current drain meter.

Although the power control module 240 may determine the amount of power consumed by the device 221 based on information from a power consumption monitor 261 (or multiple power consumption monitors associated with various portions of the device 221), the power control module 240 may determine the amount of power consumed by the device 221 by less direct methods.

In some implementations, the power control module 240 may determine the amount of power consumed by the device 221 by accessing power consumption data 241 stored on the device 221 indicative of expected power consumed by the device 221 in various configurations (e.g., by various power consuming functions 270 or having various sets of power consuming functions 270 enabled or disabled). In some implementations, the power consumption data 241 includes manufacturing test data gathered when the device 221 (or a component thereof) was built. In some implementations, the manufacturing test data includes information about how well a particular chip performs or how sensitive a radio and antenna are as a system once the device 221 is assembled. As different pieces of silicon may require different voltages to achieve the same operating point, the power consumption data 241, in some implementations, includes information about the voltages used to achieve a particular operating point for a particular chip. As chips are stressed and aged, these voltages may change over time and the power control module 240, in some implementations, determines the amount of power consumed by the device 221 based on additional information regarding age and/or usage of a particular chip.

In some implementations, the power control module 240 determines the amount of power consumed by the device 221 based on data received from one or more sensors 260. In some implementations, the sensors 260 include an environmental sensor 262, such as a temperature sensor, a pressure sensor, a humidity sensor, a light sensor, or an infrared sensor. Based on the information provided by such a sensor, the power control module 240 determines, in some implementations, the amount of power consumed by the device 221 through estimation rather than direct measurement. For example, if a temperature sensor indicates that the device 221 is cold, the power control module 240 may determine that the amount of power consumed by the device 221 is less than would be determined if the temperature sensor indicated that the device was hot. In some implementations, the sensors 260 include a position sensor 263, such as an accelerometer, magnetometer, gyroscope, proximity sensor, or GPS (global positioning system) sensor. For example, if a proximity sensor indicates that an object is impeding airflow around the device 221, the power control module 240 may determine that the amount of power consumed by the device 221 is more than would be determined if the proximity sensor indicated that no such object was present. Similarly, a pressure sensor may indicate the air density around the device 211 and the power control module 240 may estimate the amount of power consumed by the device 211 due to different convection parameters and resulting temperature changes. Although the sensors 260 are illustrated separately from the power consuming functions 270 in FIG. 2, it is to be appreciated that the sensors 260 and/or their operation may themselves be power consuming functions. Further, although certain types of sensors 260 are illustrated in FIG. 2, it is to be appreciated that the device 221 may include other types of sensors 260, such as a camera, a chemical sensor (e.g., carbon monoxide or others), or a microphone.

In some implementations, the power control module 240 determines the amount of power consumed by the device 221 based on information received via the port 250, such as information received from the Internet. In some implementations, the power control module 240 receives information from a database of live, real-time information on the status and history of devices in operation such as a database of a cloud-based controller architecture. For example, the power control module 240 may receive information indicating that a particular power consuming function designed to consume approximately 4.0 W typically consumes between 2.1-2.4 W of power. Accordingly, rather than determine the amount of power consumed by the device 221 using the 4.0 W metric for the particular power consuming function, the power control module 240 may determine the amount of power consumed by the device 221 assuming that the power consuming function consumes 2.4 W (or, for additional safety against failure, 2.6 W or 3.0 W).

Additional information received the port 250 that may be used by the power control module 240 to determine the amount of power consumed by the device 221 may include, without limitation, information about special events (e.g., patches or software releases) that may signal computer demand on a piece of hardware, weather forecasts or patterns that may impact the environmental conditions of a piece of hardware and therefore impact its energy budget for computational tasks, upcoming tradeshows/conferences, car traffic or pedestrian data that may allow the prediction of a high concentration of users of the device 221, or video streaming statistics.

Thus, as described above, in some implementations, the power control module 240 determines an amount of power available to the device 221 and an amount of power consumed by the device 221. Based on this information, the power control module 240 selectively enables or disables one or more power consuming functions 270 of the device. For example, if the difference between the amount of power available and the amount of power consumed is large, the power control module 240 may enable an additional power consuming function 270 to consume this unused available power. As another example, if the difference between the amount of power available and the amount of power consumed is small, the power control module 240 may disable a power consuming function 270 to provide a safety margin and avoid failure of the device 221 or degradation of performance of other power consuming functions 270, including, but not limited to, core features of the device 221. The power control module 240 may select which power consuming function 270 to enable or disable based on a number of factors as described below.

In some implementations, in order to enable a power consuming function 270 including hardware 271, the power control module 240 enables power received via the port 250 to activate the hardware 271. In some implementations, the power control module 240 actively routes power to the hardware 271, transmits a signal to the hardware 271 to activate it, or transmits a signal to other hardware that enables power to activate the hardware 271. In some implementations, in order to enable a power consuming function 270 including executable code 272, the power control module 240 instructs a processor of the device 221 (of which the power control module 240 may be a part or separate) to execute the executable code 272.

In some implementations, the power control module 240 continuously monitors and controls the amount of power consumed by the device 221 and repeatedly enables or disables power consuming functions 270. For example, in some implementations, the power control module 240 determines an updated amount of power consumed by the device and selectively enables or disables one or more power consuming functions 270 based on the amount of power available (which may also be updated) and the updated amount of power consumed by the device 221.

Figure 3:
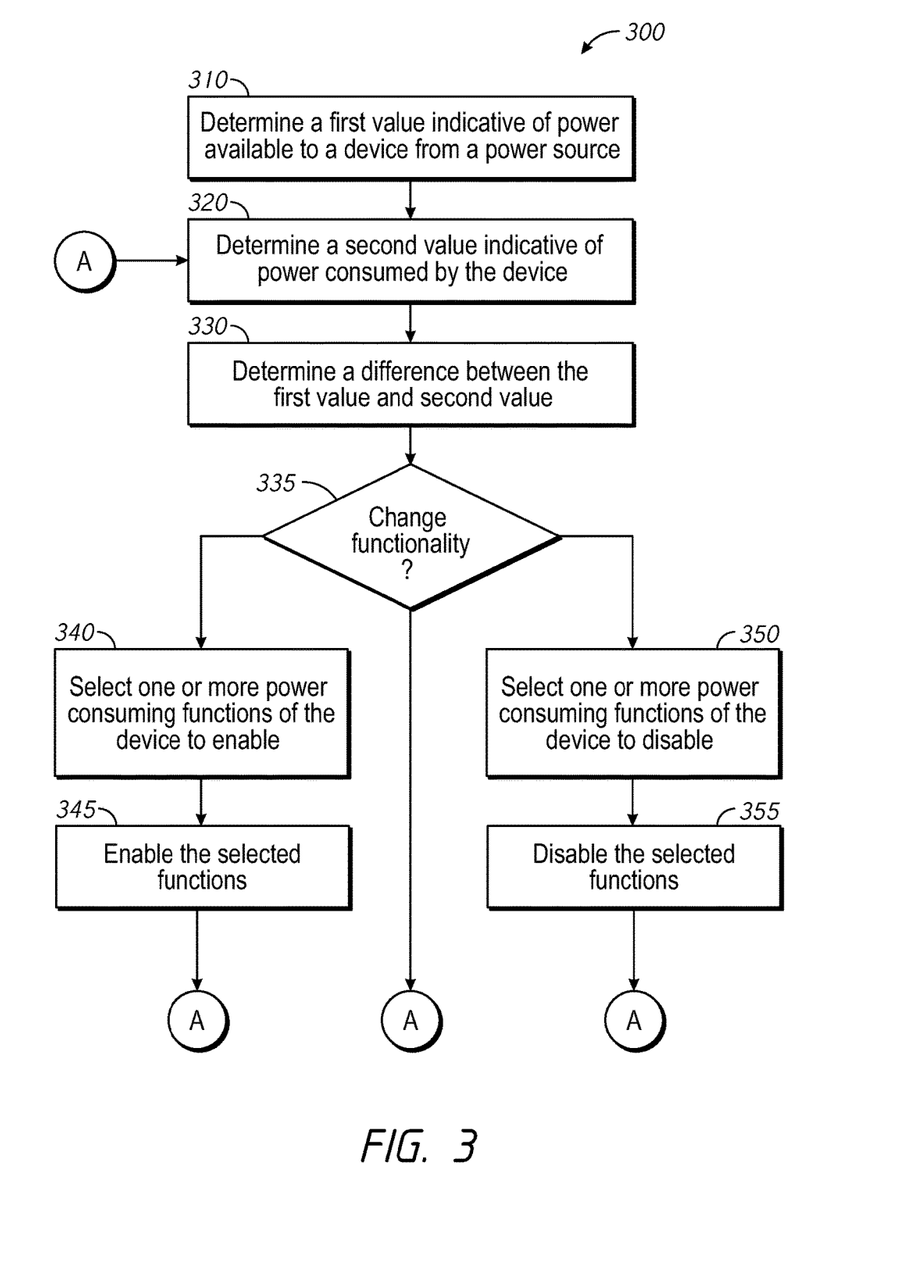
FIG. 3 is a flowchart representation of a method selectively enabling and/or disabling power consuming functions of a device in accordance with some implementations.

FIG. 3 is a flowchart representation of a method 300 of selectively enabling and/or disabling power consuming functions in accordance with some implementations. In some implementations (and as detailed below as an example), the method 300 is performed by a power control module of a device, such as the power control module 240 of FIG. 2. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes determining values indicative of power available to a device and power consumed by the device during operation, and selectively enabling and/or disabling one or more functions or features of the device based on the determined values.

The method 300 begins, at block 310, with the power control module determining a first value indicative of power available to a device from a power source. In some implementations, the first value is a continuous value that indicates the power available in watts or any other unit. In some implementations, the first value is a discrete value (one of a plurality of possible values), such as '0' if the amount of power available is low amount and '1' if the amount of power is a high amount. In some implementations, the power source delivers power to the device via an Ethernet cable. In some implementations, determining the first value includes receiving a signal from the power source indicative of an amount of power available to the device. For example, in some implementations, the power control module receives a signal encoding a value indicative of an amount of power (e.g., in watts) available to the device and the power control module determines the first value based on the received value. For example, the first value may be the received value or the received value less a safety margin. In some implementations, determining the first value includes receiving a signal from the power source indicative of a power standard employed by the power source in delivering power to the device. For example, in some implementations, the power control module receives a signal encoding a flag indicating that IEEE 802.3af or IEEE 802.3at is being used. As an example, the power control module may determine the first value as 12.95 W if the flag indicates that IEEE 802.3af is being used.

At block 320, the power control module determines a second value indicative of the power consumed by the device. In some implementations, the second value is indicative of the power being currently consumed by the device during operation of the device. The second value (like the first value) may be a continuous value or a discrete value. In some implementations, determining the second value includes receiving data from a power consumption monitor of the device and determining the second value based on the received data. In some implementations, determining the second value comprises receiving data from one or more environmental sensors of the device and determining the second value based on the received data.

As described above, the power control module may determine the amount of power consumed by the device in a number of ways. Similarly, the power control module may determine the second value indicative of the amount of power consumed by the device in the same ways.

In some implementations, the power control module determines the second value by accessing power consumption data stored on the device indicative of expected power consumed by the device in various configurations (e.g., by various power consuming functions enabled or having various sets of power consuming functions enabled or disabled). In some implementations, the power control module determines the second value using data indicative of actual power consumption, rather than (or in addition to) expected or designed power consumption. For example, in some implementations, the power control module determines the second value based on data received from one or more sensors. In some implementations, the power control module determines the second value based on a monitored value generated by one or more power consumption monitors. In some implementations, the power control module determines the amount of power consumed by the device based on information received over a network. For example, in some implementations, the power control module receives information from a database of live, real-time information on the status and history of devices in operation.

At block 330, the power control module determines a difference between the first value and second value. In some implementations, this difference is indicative of an amount of power that is available to be consumed by the device, but is not being consumed by the device. At block 335, the power control module determines whether to change the functionality of the device. In some implementations, the power control module makes this determination based on the difference between the first value and the second value. For example, if the difference is above a first threshold, the power control module may determine to change the functionality of the device by enabling one or more power consuming functions and the method proceeds to block 340. If the difference is below a second threshold, the power control module may determine to change the functionality of the device by disabling one or more power consuming functions and the method proceeds to block 350. If the difference is between the first and second thresholds, the power control module may determine not to change the functionality of the device and the method returns to block 320.

Attempting to draw more power to the device than can be provided by a power source may cause failure of the device or degradation of performance of currently enabled power consuming functions. In some implementations, if a device attempts to draw more power than can be provided by a power source, the power source may cease to provide any power, resulting in failure of the device. In some implementations, if a device attempts to draw more power than can be provided, a brownout or overcurrent condition may occur that may result in failure of the device, damage to the device or switching hub, or degradation of performance of the device.

In determining to change the functionality of the device by disabling one or more power consuming functions, the power control module avoids attempting to draw more power to the device than can be provided. In determining to change the functionality of the device by enabling one or more power consuming functions, the power control module intelligently reduces the safety margin between the power available and power consumed without attempting to draw more power to the device than can be provided while still enabling the device to reach otherwise unobtainable performance levels for a given device.

At block 340, the power control module selects one or more power consuming functions of the device to enable. The power control module may select the power consuming functions to enable in a number of ways. In some implementations, the power consuming functions is selected based on an estimated power consumption of the power consuming functions, based on information received over a network indicating priority of the power consuming functions, based on stored user preferences indicating priority of the power consuming functions, or any other information. An example method of selecting a power consuming function is described in detail below with respect to FIG. 5.

At block 345, the power control module enables the selected power consuming functions. In some implementations, enabling the selected power consuming functions includes activating (e.g., powering) hardware of the device associated with at least one of the power consuming functions. In some implementations, enabling the selected power consuming functions includes executing code (e.g., with a processor of the device) associated with at least one of the power consuming functions. In some implementations, enabling the selected power consuming functions comprises increasing or decreasing a hardware or software parameter. In some implementations, the power control module enable the selected power consuming functions by transmitting a signal (e.g., to a processor) to enable the power consuming functions.

At block 350, the power control module selects one or more power consuming functions of the device to disable. As in block 340, the power control module may select the power consuming functions to disable in a number of ways. In some implementations, the power consuming functions are selected based on an estimated power consumption of the power consuming functions, based on information received over a network indicating priority of the power consuming functions, based on stored user preferences indicating priority of the power consuming functions, or any other information. An example method of selecting a power consuming function is described in detail below with respect to FIG. 5.

At block 355, the power control module disables the selected power consuming functions. In some implementations, disabling the selected power consuming functions includes deactivating (e.g., depowering) hardware of the device associated with at least one of the power consuming functions. In some implementations, disabling the selected power consuming functions includes ceasing to execute code (e.g., with a processor of the device) associated with at least one of the power consuming functions. In some implementations, disabling the selected power consuming functions includes increasing or decreasing a hardware or software parameter. In some implementations, the power control module may disable the selected power consuming functions by transmitting a signal (e.g., to a processor) to disable the power consuming functions.

After blocks 345 and 355 (and in response to determining in block 355 not to change the functionality of the device), the method 300 returns to block 320 where the power control module determines an updated second value indicative of power consumed by the device (with one or more power consuming functions possibly enabled or disabled). The method 300 may proceed again with the power control module selecting one or more additional power consuming functions to be enabled (in block 340) or selecting one or more power consuming functions to be disabled (in block 350). The selected one or more power consuming functions to be disabled may include at least one of the power consuming functions previously enabled by an earlier iteration through the method 300. The method 300 may include enabling (in block 345) or disabling (in block 355) the update-selected power consuming function.

The method 300 returns, once again, to block 320, such that the power control module continuously monitors and controls the amount of power consumed by the device and repeatedly enables or disables power consuming functions.

Figure 4:
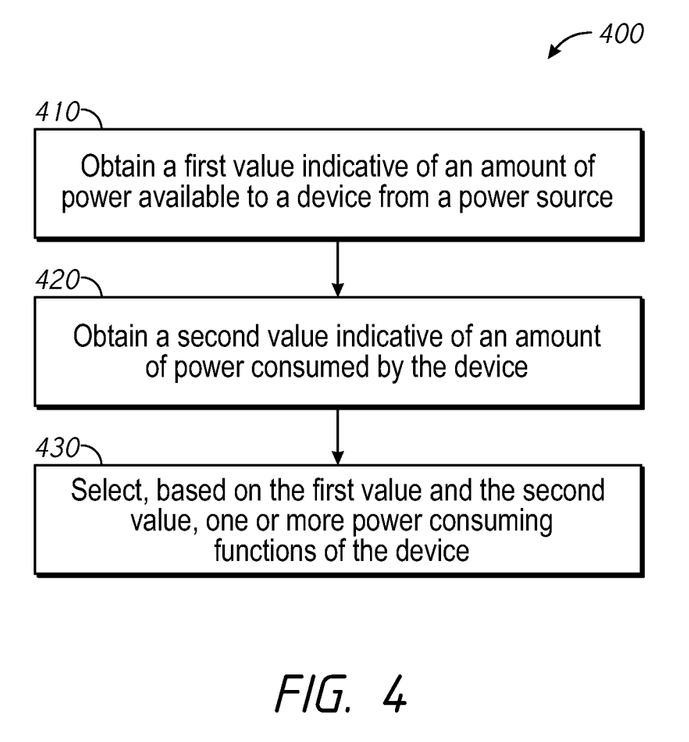
FIG. 4 is a flowchart representation of a method of managing power consumption of a device in accordance with some implementations.

FIG. 4 is a flowchart representation of a method 400 of managing power consumption of a device in accordance with some implementations. In some implementations (and as detailed below as an example), the method 400 is performed by a power control module of a device, such as the power control module 240 of FIG. 2. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes obtaining values indicative of power available to a device and power consumed by the device during operation, and selecting one or more power consuming functions of the device based on the determined values in order to manage power consumption of the device.

The method 400 begins, at block 410, with the power control module obtaining a first value indicative of an amount of power (e.g., a power level) available to a device from a power source. At block 420, the power control module obtains a second value indicative of an amount of power consumed by the device. Blocks 410 and 420 may be performed as described above with respect to block 310 and 320 of FIG. 3. Although blocks 410 and 420 are described sequentially, it is appreciated that they may be performed sequentially in any order, simultaneously, or overlapping in time.

At block 430, the power control module selects one or more power consuming functions of the device based on the first value and the second value. In some implementations, the power control module selects the power consuming functions based on a difference between the first value and the second value. In some implementations, the power control module selects the power consuming functions based on the first value and the second value without determining a difference between the two values.

In some implementations, the power consuming functions are selected based on an estimated power consumption of the power consuming functions, based on information received over a network indicating priority of the power consuming functions, based on user preferences indicating priority of the power consuming functions, or any other information. An example method of selecting a power consuming function is described in detail below with respect to FIG. 5.

The method 400 may include enabling and/or disabling the selected one or more power consuming functions. Enabling the power consuming functions may be performed as described above with respect to block 345 of FIG. 3. Disabling the power consuming functions may be performed as described above with respect to block 355 of FIG. 3.

Figure 5:
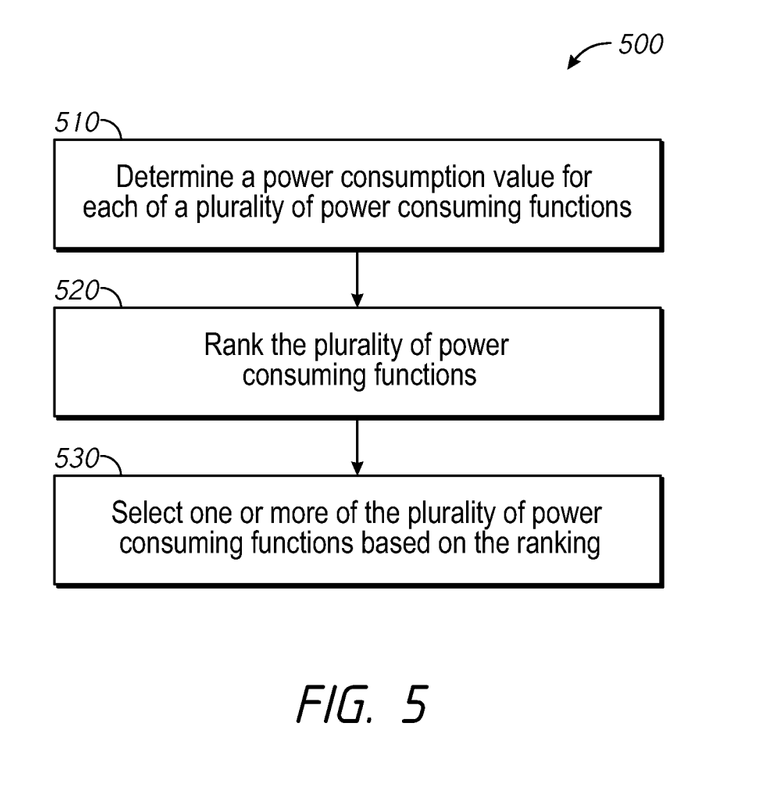
FIG. 5 is a flowchart representation of a method of selecting power consuming functions to enable or disable in accordance with some implementations.

FIG. 5 is a flowchart representation of a method 500 of selecting power consuming functions to enable or disable in accordance with some implementations. In some implementations (and as detailed below as an example), the method 500 is performed by a power control module of a device, such as the power control module 240 of FIG. 2. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes determining a power consumption value for a number of power consuming functions, ranking the power consuming functions, and selecting one or more of power consuming functions based on the ranking.

The method 500 begins, at block 510, with the power control module determining a power consumption value for each of a plurality of power consuming functions. In some implementations, the power consumption value may be indicative of an amount of power consumed by the power consuming function. In some implementations, the power consumption value may be indicative of a difference between a first amount of power consumed by the device with the power consuming function enabled and a second amount of power consumed by the device with the power consuming function not enabled.

The power consumption value for each of the plurality of power consuming functions may be determined in a number of ways. In some implementations, the power consumption value is based on power consumption data stored in the device (e.g., power consumption data 241 of FIG. 2). In some implementations, the power consumption data includes a table that associates each of the plurality of power consuming function with a power consumption value. In some implementations, the power consumption values are determined in much the same way as the amount of power consumed by the device as described above, but specific to particular power consuming functions. For example, in some implementations, the power consumption values are based on sensor data or information received over a network.

In some implementations, in order to select one or more power consuming functions to disable, the power consumption values are based on data of actual power consumption of the power consuming functions in operation. In some implementations, in order to select one or more power consuming functions to enable, the power consumption values are based on data of expected power consumption of the power consuming functions.

At block 520, the power control module ranks the plurality of power consuming functions. In some implementations, the power control module ranks the plurality of power consuming functions by providing a ranking value to each of the plurality of power consuming functions indicative of a desirability to enable (or not disable) the power consuming function. In some implementations, the ranking values are stored in a fixed table that associates each power consuming function with a ranking value. In some implementations, the ranking values may be dynamically generated by the power control module based on received information. For example, in some implementations, the ranking values are based on user preferences received by the power control module indicating desirability of particular power consuming functions.

In some implementations, the ranking values are based on sensor data or data received over a network. For example, the data over the network may indicate nearby client device hardware and/or software limitations resulting in a higher ranking for range over throughput or resulting in elimination of support for a specific band or channel. As another example, the data over the network may indicate that client device density has or is predicted to increase, shifting rankings in favor or more CPU/memory power consumption over radio power consumption. In some implementations, the data received over the network may include an indication of one or more power consuming functions that are to be enabled, if possible. For example, the data received over the network may indicate that a scanning radio should be enabled to detect interference in the environment.

In some implementations, the ranking values are based on the determined power consumption values. For example, if the power consumption value for a particular power consuming function is low, the power control module may assign a higher ranking value to the power consuming function as the desirability of the power consuming function may be increased by having low power consumption.

At block 530, the power control module selects one or more of the plurality of power consuming functions based on the ranking. In some implementations, the power control module also selects the power consuming functions based on the determined power consumption values. In some implementations, the sum of the power consumption values of the selected one or more power consuming functions is less than a difference between a first value indicative of an amount of available power and a second value indicative of amount of power consumed. As an example, based on a first value indicating that the device has 14.3 W of power available and a second value indicative that the device is consuming 12.1 W, the power control module may determine that 1.2 W (e.g., 14.3−12.1) worth of power consuming functions are to be enabled. In some implementations, the power control module selects the highest ranked power consuming function having a power consumption value less than 1.2 W. If this leaves additional power to be used, in some implementations, the power control module additionally selects the highest ranked remaining power consuming function having a power consumption value less than the remaining additional power. As another example, the power control module may determine that 0.5 W worth of power consuming functions are to be disabled. In some implementations, the power control module selects the lowest ranking power consuming function having a power consumption value greater than 0.5 W. In some implementations, the power control module repeatedly selects the lowest ranking power consuming function until the sum of their power consumption values is greater than 0.5 W.

In some implementations, the sum of the power consumption values of the selected one or more power consuming functions is less than a difference between a first value indicative of an amount of available power and a second value indicative of amount of power consumed, with the difference reduced by a power safety margin. For example, the first value may indicate that the device has 14.3 W of power available and the second value indicative that the device is consuming 12.1 W. Rather than determining that 1.2 W worth of power consuming functions are to be enabled, the power control module may determine that only 1.0 W worth of power consuming functions are to be enabled based on a power safety margin of 0.2 W.

Figure 6:
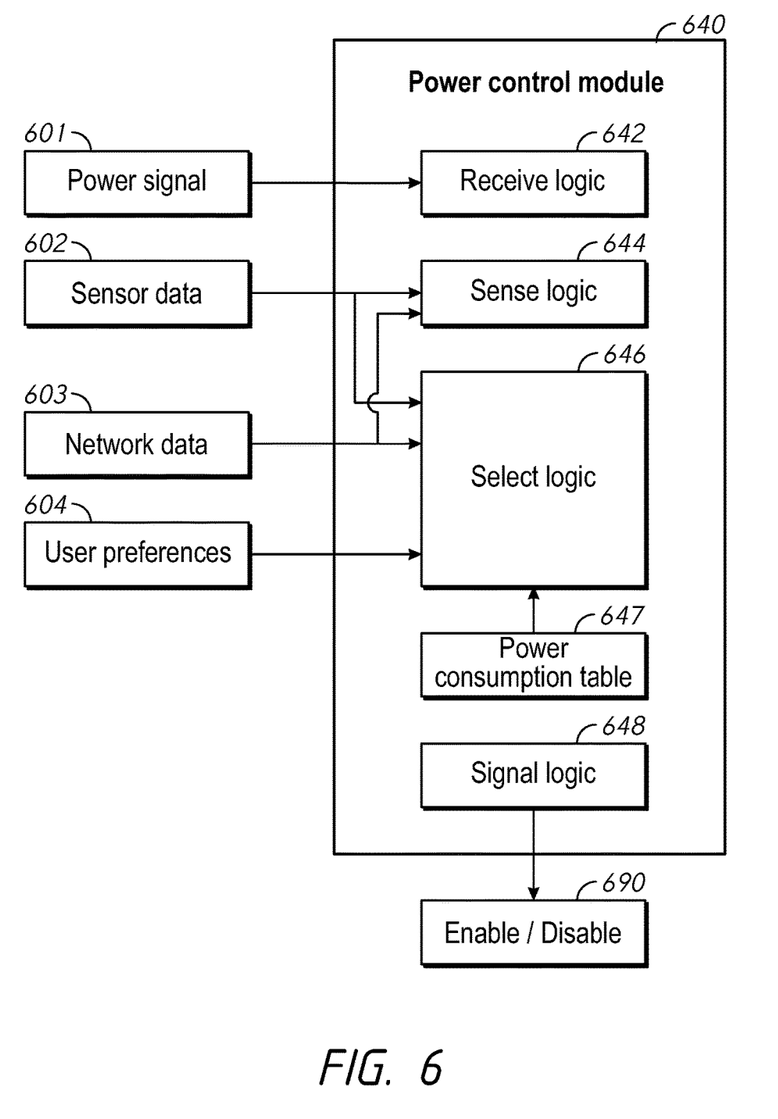
FIG. 6 is a block diagram of a power control module in accordance with some implementations.

FIG. 6 is a block diagram of a power control module 640 in accordance with some implementations. FIG. 6 illustrates various inputs that may be provided to the power control module 640 and various logic components thereof and an output that may be provided by the power control module 640. The power control module 640 (and the various submodules thereof) may be implemented via hardware, software, firmware, or a combination thereof.

The power control module 640 includes receive logic 642 that is configured to obtain a first value indicative of an amount of power available to a device from a power source. In some implementations, the receive logic 642 obtains the first value based on a received power signal 601 indicative of an amount of power available to the device. In some implementations, the power signal 601 encodes a value indicative of an amount of power available to the device (e.g., in watts). In some implementations, the power signal 601 encodes a flag indicative of a power standard (e.g., IEEE 802.3af or IEEE 802.3at) employed by the power source in delivering power to the device. The receive logic 642 may perform block 410 as described above with respect to FIG. 4.

The power control module 640 includes sense logic 644 that is configured to obtain a second value indicative of an amount of power consumed by the device. In some implementations, the sense logic 644 determines the second value based on a received signal from a sensor including sensor data 602. In some implementations, the sense logic 644 determines the second value based on a received signal over a network including network data 603. For example, in some implementations, the sensor data 602 includes data from one or more power consumption monitors. As another example, in some implementations, the network data 603 includes information from a database of live, real-time information on the status and history of devices in operation. The sense logic 644 may perform block 420 as described above with respect to FIG. 4.

The power control module 640 includes select logic 646 that is configured to select one or more power consuming functions of the device based on the first value and the second value. In some implementations, the select logic 646 determines power consumption values for each of a plurality of power consuming functions using the sensor data 602, network data 603, and/or information in a power consumption table 647 associating each of the plurality of power consuming functions with a power consumption value. In some implementations, the select logic 646 ranks the plurality of power consuming functions and selects one or more of the power consuming functions based on the ranking. The select logic 646 may perform block 430 as described above with respect to FIG. 4 and/or method 500 as described above with respect to FIG. 5.

The power control module 640 includes signal logic 648 that is configured to transmit an enable/disable signal 690 to enable or disable the selected one or more power consuming functions. The signal logic 648 may perform block 345 or 355 as described above with respect to FIG. 3.

Figure 7:
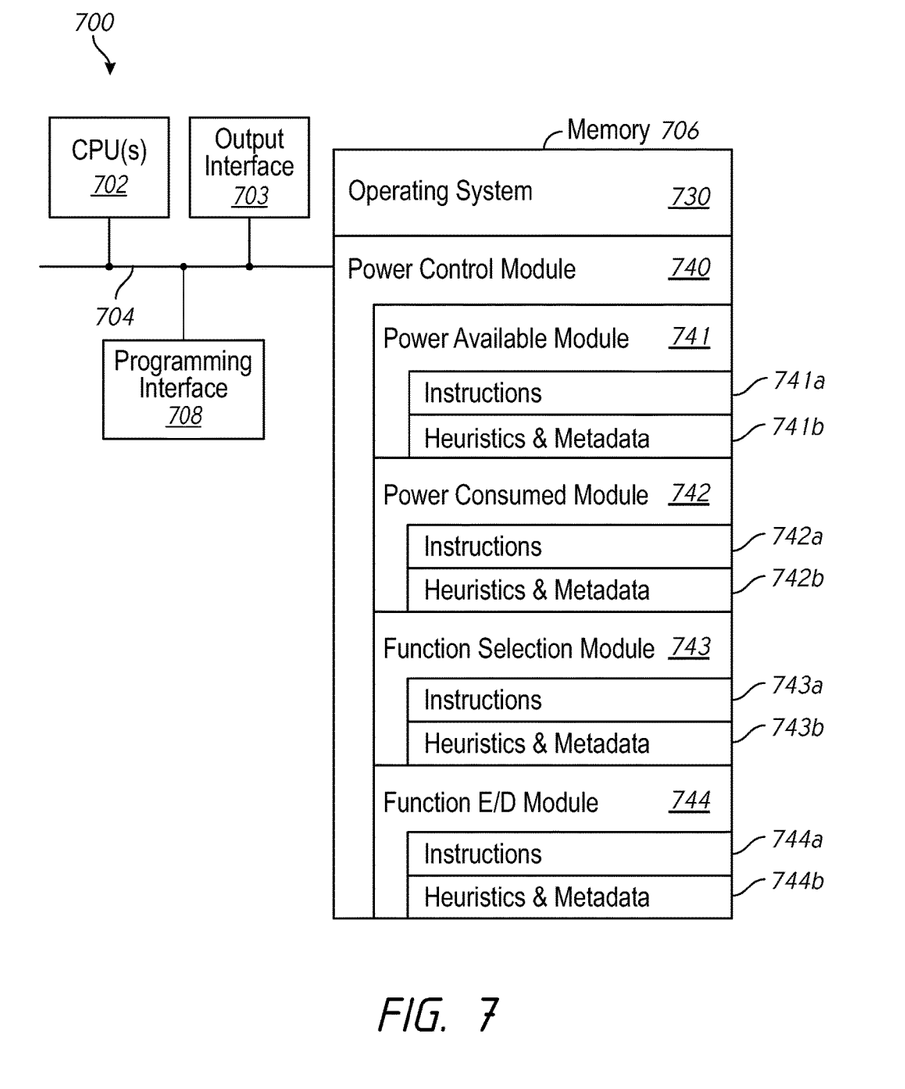
FIG. 7 is a block diagram of a computing device in accordance with some implementations.

FIG. 7 is a block diagram of a computing device 700 in accordance with some implementations. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703, a memory 706, a programming interface 708, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730 and a power control module 740. In some embodiment, one or more instructions are included in a combination of logic and non-transitory memory. The operating system 730 includes procedures for handling various basic system services and for performing hardware dependent tasks. In some implementations, the power control module 740 is configured to selectively enable and disable power consuming functions of a device (which may include the computing device 700 or be separate from the computing device 700) based on information indicative of power available to the device and power consumed by the device. To that end, the power control module 740 includes a power available module 741, a power consumed module 742, a function selection module 743, and a function enable/disable module 744.

In some implementations, the power available module 741 is configured to obtain a first value indicative of power available to the device from a power source. To that end, the power available module 741 includes a set of instructions 741a and heuristics and metadata 741b. In some implementations, the power consumed module 742 is configured to obtain a second value indicative of power consumed by the device. To that end, the power consumed module 742 includes a set of instructions 742a and heuristics and metadata 742b. In some implementations, the function selection module 743 is configured to selects one or more power consuming functions of the device based on the first value and second value in order to manage power consumption of the device. In some implementations, the function selection module 743 selects the power consuming functions based on a difference between the first value and the second value. To that end, the function selection module 743 includes a set of instructions 743a and heuristics and metadata 743b. In some implementations, the function enable/disable module 744 is configured to enable or disable the selected functions. To that end, the function enable/disable module 744 includes a set of instructions 744a and heuristics and metadata 744b.

Although the power control module 740, the power available module 741, the power consumed module 742, the function selection module 743, and the function enable/disable module 744 are illustrated as residing on a single computing device 700, it should be understood that in other embodiments, any combination of the power control module 740, the power available module 741, the power consumed module 742, the function selection module 743, and the function enable/disable module 744 may reside in separate computing devices. For example, each of the power control module 740, the power available module 741, the power consumed module 742, the function selection module 743, and the function enable/disable module 744 may reside on a separate computing device.

Moreover, FIG. 7 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising: at a device including a port that receives power and data, a non-transitory computer-readable medium including instructions corresponding to a power control module that manages power consumption of the device, and a plurality of power consuming functions:

receiving, by the device, via the port, an energy provision rate value indicative of an amount of power that can be provided by a power source to the device;

determining, by the power control module, an energy consumption rate value indicative of an amount of power that is being consumed by the device;

determining ranking values for at least a portion of a plurality of power consuming functions of the device;

selecting, by the power control module, based on the energy provision rate value, the energy consumption rate value, and the ranking values, one or more of the plurality of power consuming functions of the device;

wherein selecting the one or more power consuming functions comprises:

determining a power consumption value for each of the plurality of power consuming functions;

selecting, based on the ranking values, the one or more power consuming functions, wherein the sum of the power consumption values of the one or more power consuming functions is less than a difference between the energy provision rate value and energy consumption rate value; and enabling or disabling, by the power control module, the one or more of the plurality of power consuming functions in order to manage power consumption of the device.

2. The method of claim 1, wherein enabling or disabling the selected power consuming functions comprises activating or deactivating hardware of the device associated with at least one of the one or more power consuming functions.

3. The method of claim 1, wherein enabling or disabling the selected power consuming functions comprises executing or ceasing execution of code with a processor of the device associated with at least one of the one or more power consuming functions.

4. The method of claim 1, wherein the power source delivers power to the device via an Ethernet cable.

5. The method of claim 1, wherein receiving the energy provision rate value comprises receiving a data signal from the power source indicative of the amount of power that can be provided to the device.

6. The method of claim 1, wherein receiving the energy provision rate value comprises receiving a data signal from the power source indicative of a power standard employed by the power source in delivering power to the device.

7. The method of claim 1, wherein determining the energy consumption rate value comprising:

receiving data from a power consumption monitor of the device; and determining the energy consumption rate value based on the received data.

8. The method of claim 1, wherein determining the energy consumption rate value comprising:

receiving cloud-sourced data from a cloud-based controller architecture; and determining the energy consumption rate value based on the cloud-sourced data.

9. The method of claim 1, wherein the ranking values are based on user preferences associated with the plurality of power consuming functions.

10. The method of claim 1, wherein the ranking values are inversely proportional to corresponding power consumption values of the plurality of power consuming functions.

11. The method of claim 1, further comprising:

obtaining an updated energy consumption rate value indicative of an amount of power consumed by the device; and selecting, based on the energy provision rate value and the updated energy consumption rate value, one or more additional power consuming functions of the device in order to manage power consumption of the device.

12. A device comprising:

a port configured to receive power from an external power source; and power control circuitry comprising:

receive logic configured to receive, via the port, an energy provision rate value indicative of an amount of power that can be provided that can be provided by the external power source to the device based on a received signal from the external power source;

sense logic configured to obtain an energy consumption rate value indicative of an amount of power that is being consumed by the device based on a received signal from a sensor;

select logic configured to:

determine ranking values for at least a portion of a plurality of power consuming functions of the device; and select one or more of the plurality of power consuming functions of the device based on the energy provision rate value, the energy consumption rate value and the ranking values;

wherein select the one or more of the plurality of power consuming functions comprises:

determine a power consumption value for each of the plurality of power consuming functions;

select, based on the ranking values, the one or more power consuming functions, wherein the sum of the power consumption values of the one or more power consuming functions is less than a difference between the energy provision rate value and energy consumption rate value; and signal logic configured to transmit a signal to enable or disable the one or more power consuming functions.

13. The device of claim 12, wherein the sense logic is further configured to obtain an updated energy consumption rate value indicative of an amount of power consumed by the device based on a received updated signal from the sensor and the select logic is further configured to select an update-selected power consuming function of the device based on the energy provision rate value and the updated energy consumption rate value.

14. A non-transitory computer-readable medium including instructions that when executed by a power control module, that manages power consumption of a device, cause the device to:

receive, via a port that receives power and data, an energy provision rate value indicative of an amount of power that can be provided by a power source to the device;

determine, by the power control module, an energy consumption rate value indicative of an amount of power that is being consumed by the device;

determine, by the power control module, ranking values for at least a portion of a plurality of power consuming functions;

select, by the power control module, based on the energy provision rate value, the energy consumption rate value and the ranking values, one or more of the plurality of power consuming functions of the device;

wherein select the one or more of the plurality of power consuming functions comprises:

determine a power consumption value for each of the plurality of power consuming functions;

select, based on the ranking values, the one or more power consuming functions, wherein the sum of the power consumption values of the one or more power consuming functions is less than a difference between the energy provision rate value and energy consumption rate value; and enable or disable, by the power control module, the one or more power consuming functions in order to manage power consumption of the device.

15. The method of claim 1, wherein the energy provision rate value is greater than the energy consumption rate value and wherein enabling or disabling the one or more power consuming functions increases the energy consumption rate value.

16. The device of claim 12, wherein the sense logic is configured to obtain the energy provision rate value by receiving the data signal, from the external power source via the port, indicative of the amount of power that can be provided to the device.

17. The device of claim 12, wherein the ranking values are based on user preferences associated with the plurality of power consuming functions.

18. The device of claim 12, wherein the ranking values are inversely proportional to corresponding power consumption values of the plurality of power consuming functions.

19. The non-transitory computer-readable medium of claim 14, wherein the ranking values are based on user preferences associated with the plurality of power consuming functions.

* * * * *